United States Patent [19]

Serio, Jr.

[11] Patent Number: 4,854,476
[45] Date of Patent: Aug. 8, 1989

[54] CONTAINER AND PERIMETER SEAL THEREFOR

[75] Inventor: Donald L. Serio, Jr., Fontana, Calif.
[73] Assignee: Serco Mold, Inc., Covina, Calif.
[21] Appl. No.: 223,416
[22] Filed: Jul. 25, 1988
[51] Int. Cl.⁴ .............................................. B65D 43/08
[52] U.S. Cl. .................................... 220/357; 220/356; 220/358; 220/4 B; 277/205; 277/207 R; 277/212 R
[58] Field of Search ............... 220/308, 310, 357, 358, 220/356; 277/205, 207 R, 212 R, 212 C, 212 F

[56] References Cited

U.S. PATENT DOCUMENTS

| | | | |
|---|---|---|---|
| 1,389,542 | 8/1921 | Wereley | 220/327 |
| 2,467,061 | 4/1949 | Mason | 220/327 |
| 2,855,130 | 10/1958 | Hosler | 277/207 R X |
| 3,246,920 | 4/1966 | Pall | 277/207 R X |
| 3,294,274 | 12/1966 | Spitzberg | 220/358 |
| 4,078,810 | 3/1978 | Arendt | 277/207 R X |
| 4,418,830 | 12/1983 | Dzung et al. | 220/358 X |
| 4,555,119 | 11/1985 | Semon | 277/207 R |
| 4,632,269 | 12/1986 | Rose | 220/327 X |

Primary Examiner—Stephen Marcus
Assistant Examiner—Nova Stucker
Attorney, Agent, or Firm—Robert J. Schaap

[57] ABSTRACT

A container construction which includes a pair of mating shells and in which a perimeter seal may be optionally used to provide a fluid tight seal and preferably a water tight seal surrounding an interior compartment of the container when the two shells are disposed upon one another. One of the shells is provided with an outwardly struck rim and a perpendicularly located shoulder. The second of the shells is also provided with an outwardly struck rim and also provided with a perpendicularly arranged shoulder such that the rim on one shell will match and abut against the shoulder on the first of the shells and the rim of the first of the shells will abut the shoulder of the second of the shells. The seal is provided with a unique construction so as to match the rim arrangement between the shells and when used therewith, will provide a water or fluid tight seal to the interior of the container.

22 Claims, 5 Drawing Sheets

CONTAINER AND PERIMETER SEAL THEREFOR

BACKGROUND OF THE INVENTION

1. Field of the Invention

This invention relates in general to certain new and useful improvements in containers and perimeter seals usable therewith, and more particularly, to containers of a two piece construction having two shells and a continuous sealing member which is capable of being disposed between the two shells for providing a fluid type seal and preferably a liquid tight seal therearound.

2. Brief Description of the Prior Art

There are numerous situations in which containers must be sealed in a water tight condition so that the contents of the containers are not subject to any humid environment or liquid submerged condition where the contents could be destroyed or seriously damaged by the presence of a liquid, such as water. Containers of this type find widespread application in environments where the containers may be submerged in a body of liquid or otherwise where they may be stored in space for substantial periods of time where water damage might result. In many cases, containers of this type find widespread use in the electronics industry where it is important to maintain an atmosphere of constant humidity within the container and more importantly to preclude any water seepage into the container which could otherwise destroy the electronic components.

Many of the containers which are used for this purpose are two-piece containers that is, containers having pairs of shells such as an upper container shell and a lower container shell. The two shells are adapted for mating disposition upon one another and for this purpose, are provided with opposed rim sections which cooperate to permit inter-engagement of the two shells. Thereafter, the shells may be held together by any suitable means, such as screws, snap rings or the like.

In many cases, manufactureres have attempted to install a conventional O-ring seal between the two container shells in order to provide a liquid tight interior compartment. However, an O-ring seal merely fitted between a pair of shells having flat abutting rims is not an effective sealing means. There have also been proposed container constructions comprised of a pair of shells in which one of the shells has a rim section provided with a U-shaped or similar channel to receive an O-ring seal. The other of the shells may be provided with a flat peripheral rim section to bear against and provide a sealing contact with the O-ring seal. While this latter construction is more effective than that previously described, it nevertheless does not constitute a truly effective sealing arrangement.

In order to obtain a truly effective sealing arrangement between a pair of shells of a container, it has been necessary for container manufacturers to resort to the construction of entirely new containers. Heretofore, there was no effective perimeter seals for effectuating a true water tight seal between two existing container shells so as to obtain a water tight sealed container.

OBJECTS OF THE INVENTION

It is, therefore, one of the primary objects of the present invention to provide a container construction in which a pair of shells of the container are adapted for mating engagement without a seal and which are also usable with a perimeter sealing member in order to achieve a water tight seal therebetween.

It is another object of the present invention to provide a container construction of the type stated in which each of a pair of mating shells of a container have opposed peripheral rim portions which are adapted for seated engagement with one another and which are also adapted for receiving a peripheral sealing member therebetween.

It is a further object of the present invention to provide a container construction of the type stated which can be produced at a relatively low cost and which is capable of being used effectively with or without water seals between the two shells thereof.

It is an additional object of the present invention to provide a peripheral sealing member which is capable of snug fitting interposition between a pair of container shells to provide a water tight seal therebetween.

It is another salient object of the present invention to provide a peripheral sealing member of the type stated which can be constructed with a variety of various sizes in order to be used with different sized container shells.

With the above and other objects in view, my invention resides in the novel features of form, construction, arrangement and combination of parts presently described and pointed out in the claims.

BRIEF SUMMARY OF THE INVENTION

A container construction comprised of a pair of container shells which are adapted for mating disposition upon one another in order to provide an interior compartment. The container shells may be used in absense of or with a unique perimeter sealing member adapted for mating engagement with opposed peripheral rims on each of the container shells.

Each of the shells constitute a cooperating pair and one of the shells may serve as a lower casing and the other of the shells may serve as an upper casing or a lid therefore. In like manner, the two shells may be adapted for side by side disposition. Various means may be employed for connecting the two shells together as for example, screws which extend between the opposed shells. Otherwise, clips or like fastening means could be used for securing the two shells together. When in this secured relationship, the two shells form an interior chamber or compartment adapted for the retention of any suitable object, as for example, electronic components or the like.

Each of the shells are constructed with opposed peripheral rim sections. Moreover, each of the rim sections will face one another and be disposed in abutting contact when the two shells are secured together. A flange is formed on a first of the rim sections and extends toward a shoulder on the second of the rim sections. In like manner, a flange on the second of the rim sections extends toward a shoulder on the first of the rim sections when the shells are connected together. These flanges and the associated shoulders form a region for receiving a continuous sealing member, when the latter is used.

In a more preferred embodiment, the shoulders are also formed on the rim sections and are located in perpendicular arrangement to the associated flanges. Furthermore, a flange on the first of the rim sections is located on an outer edge of the first rim section and a flange on the second of the rim sections is located at an inner edge of the second rim section.

The sealing member is uniquely designed so that it may be optionally used, or not used, with the container shells. Moreover, when used, there is no need for alteration of the rim section design or alteration of any other portion of the container shells.

The sealing member has a first section interposed between an edge of the flange on the first rim section and the shoulder on the second rim section. The sealing member also has a second section which is interposed between an edge of the flange on the second rim section and a portion of the shoulder on the first rim section. Further, the sealing member has a third section extending between interior surfaces of the walls forming part of the container shell and which, in effect, span the rim sections.

In a more preferred embodiment, the first section of the sealing member is offset from the second section of the sealing member. In like manner, the third section is offset from the second section of the sealing member and on opposite sides thereof with respect to the first section of the sealing member.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention, but it is to be understood that such detailed description is not to be taken in a limiting sense.

BRIEF DESCRIPTION OF THE DRAWINGS

Having thus described the invention in general terms, reference will now be made to the accompanying drawings (5 sheets) in which:

DETAILED DESCRIPTION OF A PREFERRED EMBODIMENT

Figures 1, 2:
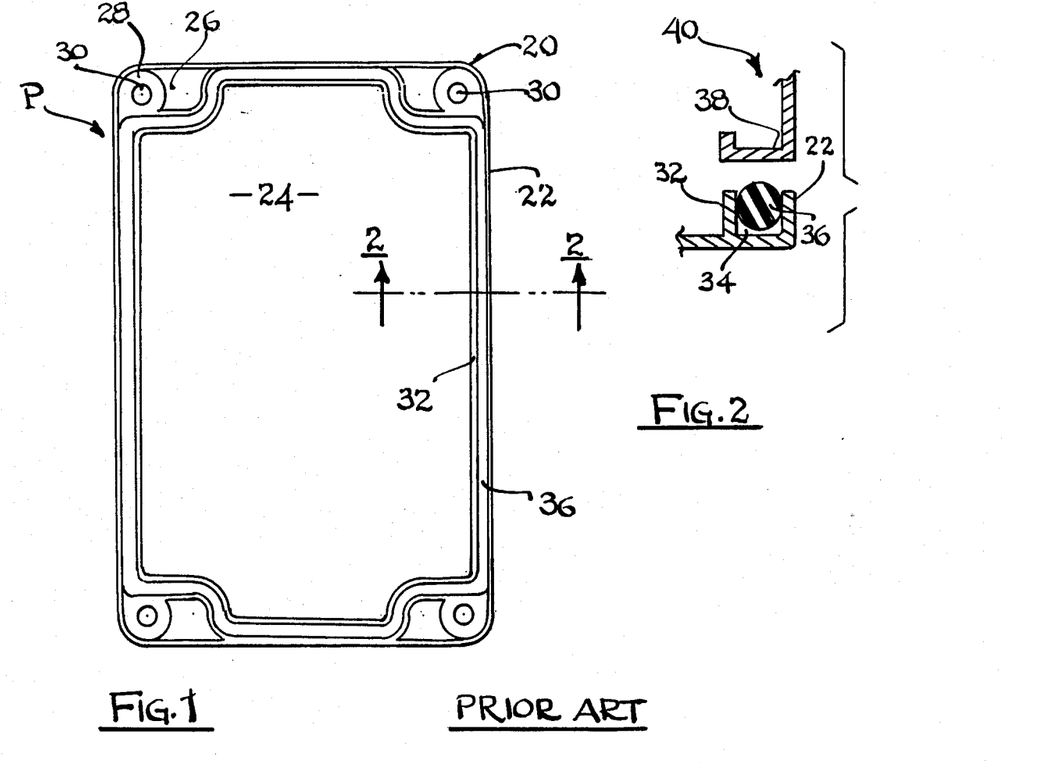
FIG. 1 is a top plan view of a prior art container construction with a sealing member arranged therein.
FIG. 2 is a sectional view taken along line 2—2 of FIG. 1 and showing a portion of the prior art construction in detail.

Referring now in more detail and by reference characters to the drawings which illustrate a preferred embodiment of the present invention, P designates a prior art container which is best illustrated in FIGS. 1 and 2 of the drawings and more specifically, shows one of the container shells 20 forming a part thereof. The view of FIG. 1 appears along a line of sight showing the interior of the container shell 20.

The container shell 20 is comprised of a continuous outer end wall 22 connected by a flat bottom wall 24. Moreover, the container shell 20 is provided with solid areas 26 having central bores 28 to receive mechanical fasteners 30 such as screws or the like in order to secure the pair of abutting container shells together.

The container shell 20 is provided on its interior surface with an interior flange 32 thereby forming a peripherally extending pocket 34, in the manner as best illustrated in FIG. 2. A continuous sealing member, such as a continuous sealing ring 36, may be located within the pocket 34. Thus, when a second container shell 38, similar to the shell 20 is disposed over the shell 20, the sealing ring 36 will engage a peripherally extending wall 40 of that other container shell 38. In this way, the sealing ring 36 is allegedly designed to provide a water tight sealing arrangement between the two container shells.

This type of sealing arrangement as illustrated in FIGS. 1 and 2 is one of the most prevalent type of sealing arrangements used in prior art container shells. However, it is to be noted that a special provision has to be made in order to receive a sealing ring. Thus, this prior art container construction was uniquely designed in order to operate only with sealing rings. Typically, another type of container construction is provided if there is not to be a liquid tight seal maintained between the two shells.

Figure 3:
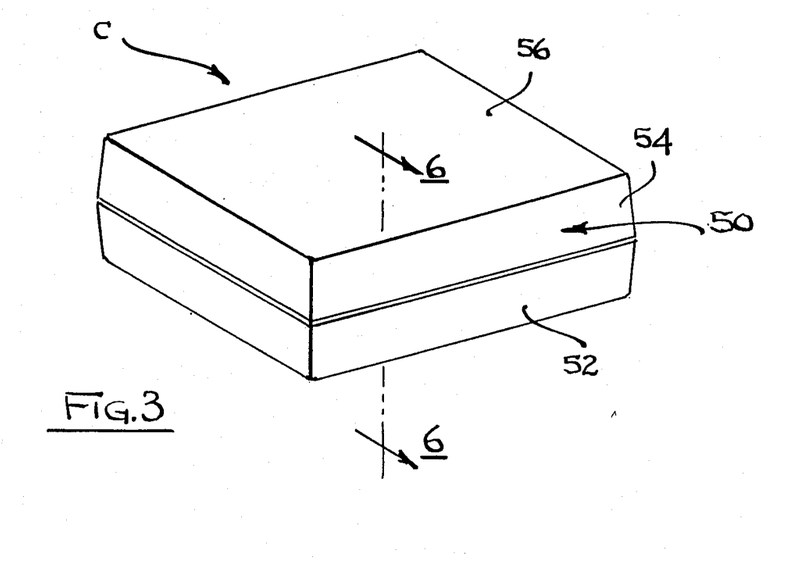
FIG. 3 is a perspective view of one embodiment of a container constructed in accordance with and embodying the present invention.
Figure 4:
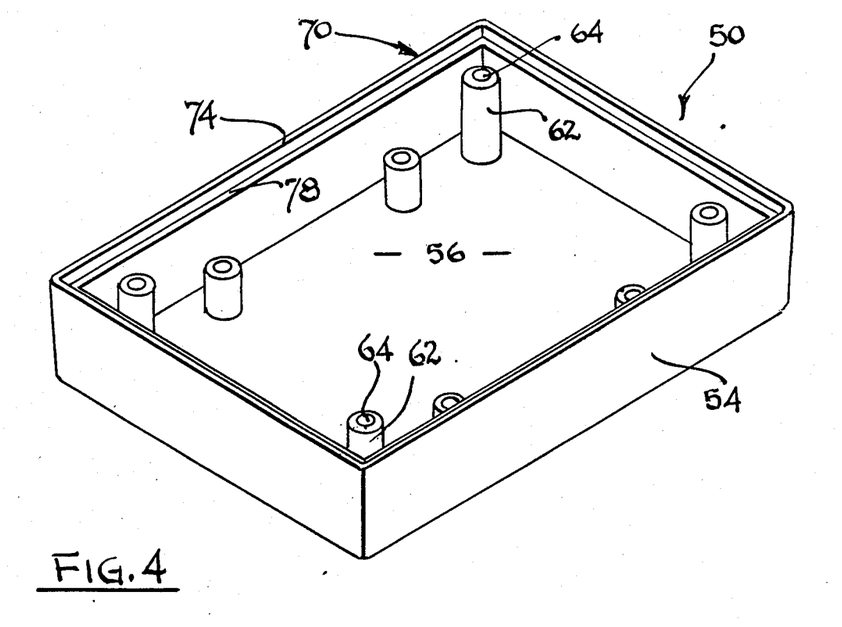
FIG. 4 is a top perspective view showing the interior of one of the shells forming part of the container of the present invention.
Figure 5:
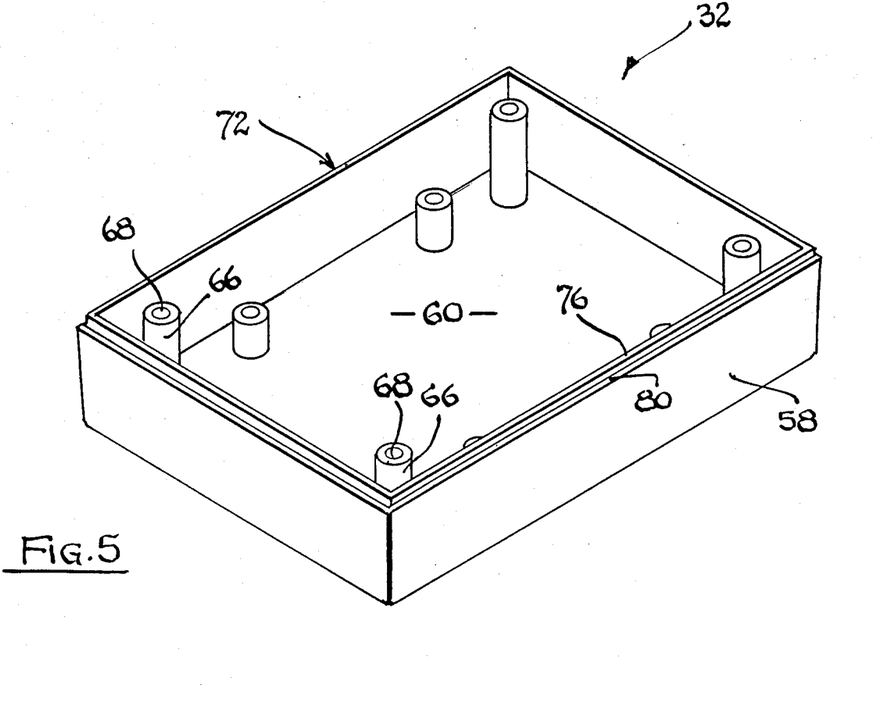
FIG. 5 is also a top perspective view showing the interior of the other of the shells forming part of the container of the present invention.
Figure 6:
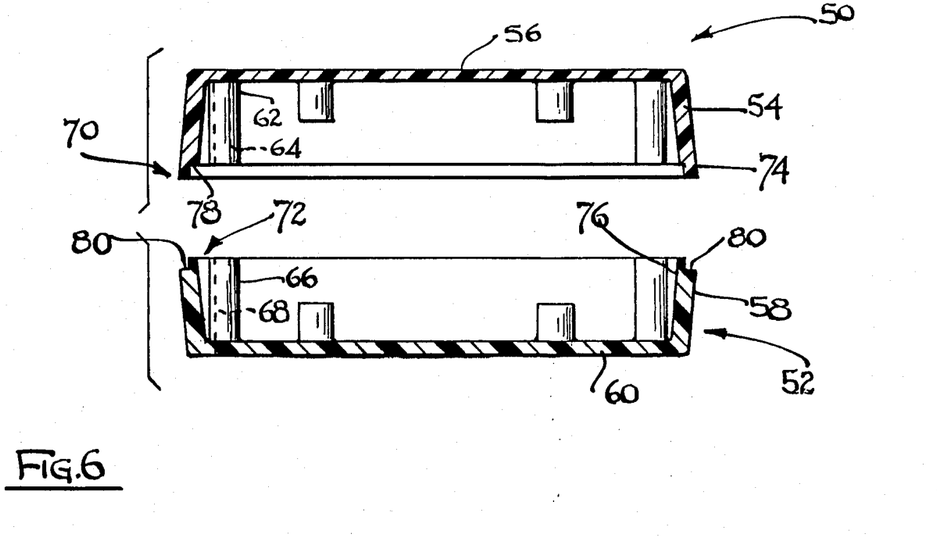
FIG. 6 is an exploded vertical sectional view taken substantially along the plane of line 6—6 of FIG. 3 and showing the two container shells in a position where they can be connected to one another.
Figure 7:
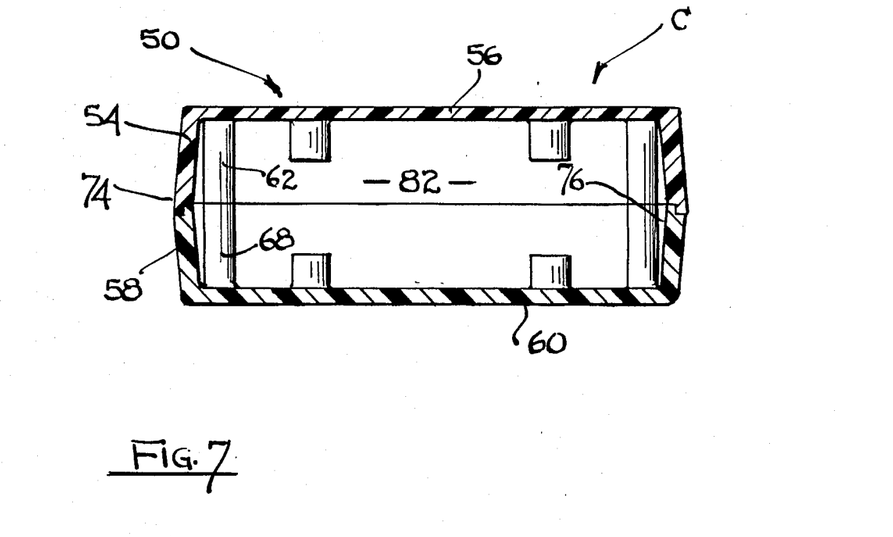
FIG. 7 is a vertical sectional view, somewhat similar to FIG. 6, and showing the two container shells in a connected arrangement.
Figure 8:
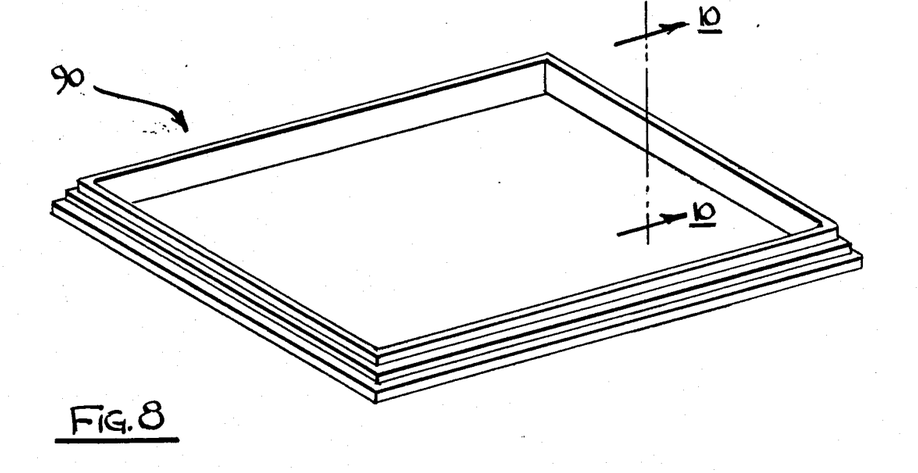
FIG. 8 is a top perspective view of a sealing member which may be used with the container of the present invention.
Figure 9:
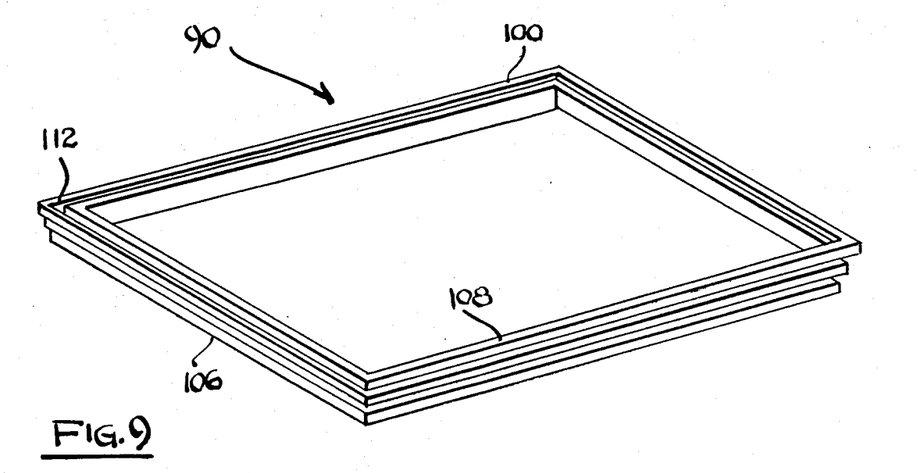
FIG. 9 is a bottom perspective view of the sealing member of FIG. 8.

FIGS. 3-5 illustrate, in perspective views, one of the containers C constructed in accordance with and embodying the present invention and which is comprised of an upper container shell 50 and a lower container shell 52. The upper container shell, sometimes considered as a first container shell, is comprised of a continuous outer side wall 54 connected by a top wall 56 in the manner as best illustrated in FIGS. 4, 6 and 7 of the drawings. The lower container shell 52, often referred to as a second container shell, is also comprised of a continuous enclosing side wall 58 and a bottom wall 60 extending thereacross. In the embodiment of the invention as illustrated, the side walls 54 and 58 are tapered outwardly with respect to the top wall 56 and the bottom wall 60, respectively. However, it should be understood that these walls could be perpendicular to the respective top wall 56 and bottom wall 60.

The various container shells 50 and 52 are preferably constructed of a suitable plastic material and for this purpose, they may be molded in any of a number of conventional molding operations. However, the various container shells may be formed of other suitable materials, such as various metals, reinforced plastic composite materials, or the like.

The container C is provided with means for connecting the two container shells 50 and 52 together. This means, also referred to as "connecting means" comprises a plurality of tubular elements 62, preferably four as shown, located at the corners of the container shell and these tubular elements 62 are provided with central bores 64 in order to receive mechanical fasteners (not shown). In like manner, the lower shell 52 is also provided with a plurality of tubular elements 66 (four as shown), also located at the corners of the shell 52. These tubular elements 66 are also provided with central bores 68 which are alignable with the central bores 64 of the tubular elements 62 in order to receive mechanical fasteners therethrough. Thus, when the two container shells 50 and 52 are connected together, in the manner as illustrated in FIGS. 3 and 7, mechanical fasteners will extend through the tubular elements. These mechanical fasteners, such as screws, will have one end as received within a champfered portion in one of the shells and will threadedly secure into the opposed shell.

The upper or first shell 50 is provided with a first peripherally extending rim section 70. In like manner, the lower or second shell 52 is provided with a peripherally extending rim section 72. The first rim section 70 is provided with an outwardly located peripherally extending rim flange 74. In like manner, the second rim section 72 is provided with an outwardly struck peripherally extending rim flange 76. In the arrangement as illustrated in FIGS. 6 and 7 of the drawings, and inasmuch as the container shell 50 functions as an upper container shell, the peripherally extending rim flange 74 is downwardly struck. Accordingly, inasmuch as the container shell 52 serves as the lower container shell, in the arrangement as illustrated, the rim flange 76 is an upwardly struck rim flange.

The first rim section 70 also comprises a shoulder 78 which is essentially perpendicularly located with respect to the rim flange 74 and is located on the interior thereof. Furthermore, the second rim section 72 is provided with a shoulder 80 which is also generally perpendicularly arranged with respect to the rim flange 76. This shoulder 80 is located outwardly of the rim flange 76 as shown.

When the two container shells 50 and 52 are connected together, it can be observed that the rim flange 74 will engage the shoulder 80. In like manner, the rim flange 76 will engage the shoulder 78. While this sealing arrangement may not necessarily constitute a liquid type sealing arrangement, it does nevertheless provide a completely enclosed compartment 82 on the interior of the container, as best illustrated in FIG. 7 of the drawings.

The container of the present invention may also be used with a uniquely designed continuous sealing member 90 for providing a completely enclosed water tight compartment 82 in the container. The sealing member 90 is best illustrated in FIGS. 8–11 of the drawings and is oftentimes referred to as a "perimeter seal". The sealing member 90 generally is constructed as an integral member and may be formed of any suitable sealing material such as a neoprene rubber material or the like. Any of the sealing materials commonly used in prior art seals, such as the sealing ring 36, may also be used in the formation of the sealing member 90.

The sealing member 90 generally comprises a first section 92 which has a somewhat rectangular cross-sectional size and shape. This first sealing member section 92 which constitutes the outermost section is adapted to be located between the downwardly struck flange 74 and the shoulder 80 in the rim sections 70 and 72. The first sealing member section 92 is connected to a second sealing member section 94 by a connecting strip 96. This second sealing member section 94 is often referred to as an "intermediate section" and has a cross-sectional size and shape which is also somewhat generally rectangular. Moreover, it has a cross-sectional size and shape somewhat approximating that of the first sealing member section 92 although the cross-sectional size is not exactly the same and the cross-sectional shape would not be exactly the same. The sealing member section 94 is adapted to be located between the upwardly struck second flange 76 and the corresponding downwardly presented shoulder 78.

Figure 10:
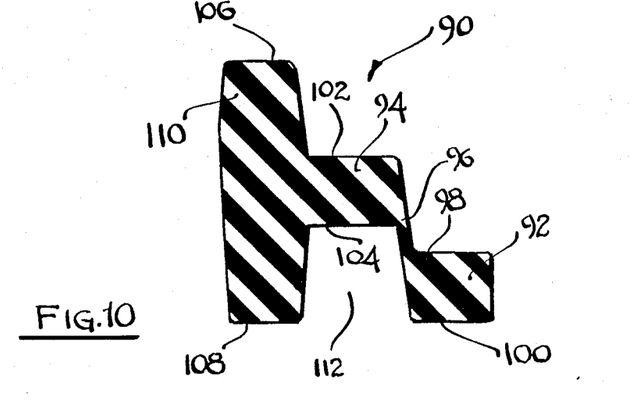
FIG. 10 is a vertical sectional view taken along line 10—10 of FIG. 8 and showing the details of the construction of the sealing member.
Figure 11:
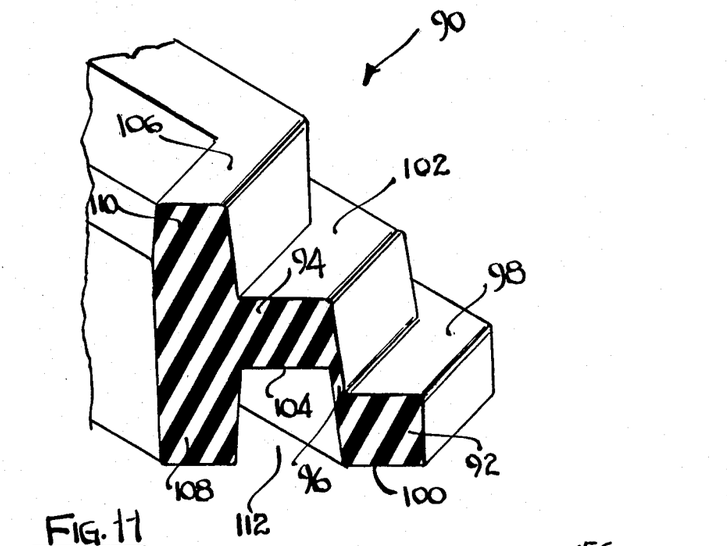
FIG. 11 is a fragmentary perspective view, broken away and showing the sealing member which may be used with the container of the present invention.

By further reference to FIGS. 10 and 11, it can be observed that the sealing member section 92 has an upwardly presented sealing surface 98 which would engage the lower tip or end of the flange 74 and a downwardly presented sealing surface 100 which would engage the shoulder 80. Furthermore, the intermediate section 94 has an upwardly presented sealing surface 102 which would engage the shoulder 78 and a downwardly presented sealing surface 104 which would engage the upwardly located tip end of the flange 76.

Figure 12:
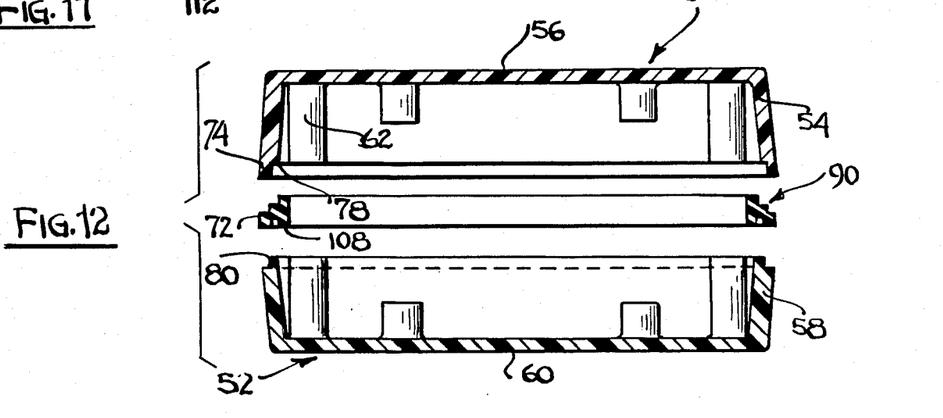
FIG. 12 is an exploded vertical sectional view showing the two container shells when the sealing member is used therewith.
Figure 13:
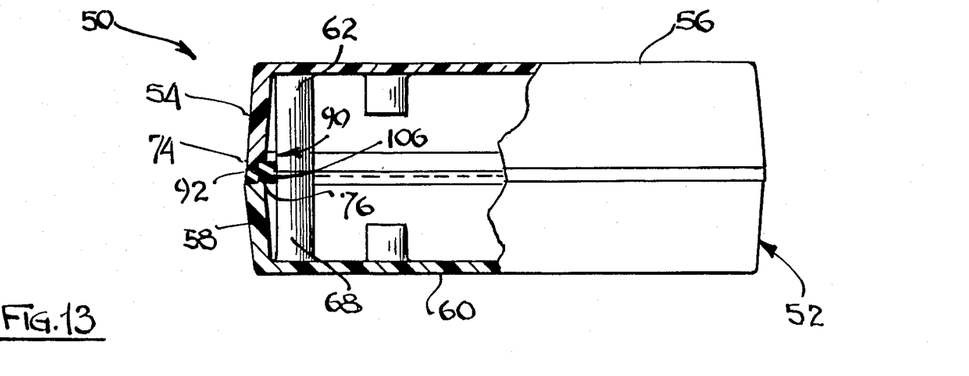
FIG. 13 is a vertical sectional view, somewht similar to FIG. 12, and showing the container shells and the sealing member in a connected arrangement.

The intermediate sealing section 94 integrally merges into a third sealing section 106, often referred to as an interior sealing section. In this case, it can be observed that the sealing section 106 has a first portion 108 which extends downwardly and is somewhat parallel in relationship to the first section 92. In like manner, the sealing section 106 has a second portion 110 which extends upwardly. In this way, the sealing section 106 will be located against the interior surfaces of the side walls 54 and 58 and will, in effect, span across the rim sections 70 and 72 when the container shells are connected together, in the manner as best illustrated in FIGS. 12 and 13 of the drawing. Inasmuch as the lower portion 108 of the third rim section 106 is spaced from the first rim section 92, there is a continuous peripherally extending groove or channel 112 and this groove or 112 is sized to extend over the upwardly struck peripherally extending flange 76.

It can be observed by reference to FIGS. 12 and 13 of the drawings, that the sealing member or perimeter seal 90 serves as an excellent sealing ring structure which provides for a complete water tight seal between the pair of container shells. Moreover, it can be observed that there is no alteration in construction and no special parts required. The sealing member conveniently and readily and easily fits between the two container shells. Moreover, due to the fact that the channel 112 snugly receives the upwardly extending flange 76, the sealing member can be retentively held in place but nevertheless easily pulled and removed therefrom when desired.

In addition to the foregoing, it can be observed that the perimeter rim constructions and the sealing member construction can be adapted for a wide variety of container sizes and shapes. Moreover, it is possible to use different sized container shells but which have matching peripheral sections. Thus, a container shell having a much deeper side wall 58 may be employed so that the upper shell functions as a cover or lid and that the lower shell functions as a primary container shell. Nevertheless, the sealing arrangement is effective utilizing interchangeable shell constructions.

Thus, there has been illustrated and described a unique and novel container construction which is capable of being used with or without a sealing member and further a unique continuous perimeter seal member which may be used with container shells. Thus, the present invention fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention, what I desire to claim and secure by letters patent is:

1. A multi-shelled container capable of use with a sealing member between the shells of the container or without the sealing member therebetween, said container comprising:
   (a) a first shell having a first peripheral rim section,
   (b) a second shell having a second peripheral rim section capable of being engaged with said first peripheral rim section when the first and second shells are connected together to form an enclosed interior chamber,
   (c) a first outwardly struck peripheral flange on said first peripheral rim,
   (d) a second outwardly struck peripheral flange on said second peripheral rim and being spaced apart from said first peripheral flange by a predetermined distance when said first and second container shells are connected together,
   (e) a first surface on said first peripheral rim section adjacent said first flange and facing an edge of said second peripheral flange when said first and second shells are connected together, said first surface contacting an edge of said second flange when said shells are abutted together without a sealing member between the two shells,
   (f) a second surface on said second peripheral rim section adjacent said second flange and facing an edge of the first peripheral flange when said first and second shells are connected together, said second surface contacting an edge of the first flange when said shells are abutted together without a sealing member therebetween, and
   (g) a sealing member provided for optional use with said container and capable of being disposed between the first and second rim sections when the interior chamber is to be provided with a liquid tight seal, said sealing member having a predefined thickness to fit in the space between the first and second flanges when employed and to allow it to fit between and to be snugly engaged by the first surface and the edge of the second peripheral flange and also to be snugly engaged by the second surface and the edge of the first peripheral flange.

2. The multi-shelled container of claim 1 further characterized in that said first surface is approximately perpendicular to said first flange and said second surface is approximately perpendicular to said second flange.

3. The multi-shelled container of claim 2 further characterized in that an outwardly presented surface on said first flange is in contact with or very slightly spaced from an inwardly presented surface of said second flange when each of the container shells are connected together without a sealing member therebetween.

4. The multi-shelled container of claim 3 further characterized in that an edge of said second surface and said first flange facing said second surface and contacting opposite sides of a first section on said scaling member and said first surface and an outer edge of said second flange contacts facing said first surface and contacting opposite sides of a second section on said sealing member, when said container shells are connected together with the use of a seal between the shells.

5. The multi-shelled container of claim 4 further characterized in that a connecting element on said sealing member extends between the outwardly presented surface and the inwardly presented surface on said first and second flanges when the sealing member is used with such multi-shelled container and extends between said first and second peripheral rim sections such that the edge of said first flange does not contact the second surface and the edge of the second flange does not contact said first surface.

6. The multi-shelled container of claim 5 further characterized in that said connecting element connects the first and second sections of said sealing member.

7. The multi-shelled container of claim 6 further characterized in that a third section on the sealing member extends between and engages portions of walls forming part of said container shells when the sealing member is used.

8. A multi-shelled container capable of use with a sealing member between the shells of the container or without the sealing member therebetween, said container comprising:
   (a) a first shell having a first peripheral rim section,
   (b) a second shell having a second peripheral rim section capable of being engaged with said first peripheral rim section when the first and second shells are connected together to form an enclosed interior chamber,
   (c) a first outwardly struck peripheral flange on said first peripheral rim,
   (d) a second outwardly struck peripheral flange on said second peripheral rim and being spaced apart from said first peripheral flange when said first and second container shells are connected together by a distance to receive a seal there-between,
   (e) a first surface on said first peripheral rim section facing an edge of said second peripheral flange when said first and second shells are connected together,
   (f) a second surface on said second peripheral rim section facing an edge of the first peripheral flange when said first and second shells are connected together to enable a sealing member to be partially captured between said peripheral rim sections, and
   (g) a sealing member having a first section interposed between the edge of the first flange and second surface when used, said sealing member having a second section offset from the the first section which is interposed between the second flange and first surface when said sealing member is used, and said sealing member having a third section extending between and engaging portions of the walls forming said container shells when the sealing member is used.

9. A sealed container construction comrprised of:
   (a) a first container shell with an outer container wall and having a first rim section thereon, (b) a first surface on said first section and a first outwardly projecting flange on said first rim section, (c) a second container shell with an outer container wall and having a second rim section thereon, (d) a second surface on said second rim section facing an edge of said first flange and a second outwardly projecting flange on said second rim section and projecting toward the first surface on the first rim section when the two container shells are connected to one another with the first and second rim sections in operative engagement, the first flange on said first rim section projecting toward said second rim section when said container shells are connected together, and (e) a continuous sealing member disposed in a space formed by said flanges and the surfaces on said rim sections and captured therein and which sealing member is not capable of being retentively held by either rim section alone, said sealing member having a predefined thickness to fit in the space between the first and second flanges when employed and to also fit between and to be snugly engaged by the first surface and an edge of the second peripheral flange and also to be snugly engaged by the second surface and an edge of the first peripheral flange.

10. The container construction of claim 9 further characterized in that the first flange and the first surface of the first rim section form two adjacent surfaces of a sealing member enclosing space and the second flange and the second surface of the second rim section form another two adjacent surfaces of a sealing member enclosing space.

11. The container construction of claim 10 further characterized in that said sealing member has a first section interposed between an edge of the first flange and a portion of the second rim section, a second sealing member section interposed between an edge of the second flange and a portion of the first rim section, and a third sealing member section extending between interior surfaces of the walls of said container shells.

12. The container construction of claim 11 further characterized in that the first section is offset from the second section and the second section is offset from the third section.

13. A continuous sealing member for use between a pair of container shells to provide a liquid tight seal between the container shells, said sealing member comprising:

(a) a first sealing member section which has a first cross sectional size and shape, (b) a second sealing member section having a second cross-sectional size and shape which is similar to that of said first section, said second section being elevated above said first section and also being offset from said first section so that the major portion of said second section extends beyond one side of said first section, (c) a relatively thin strip connecting said second sealing member section to said first sealing member section in offset said relationship therewith, and (d) a third sealing member section which has a third cross-sectional size and shape substantially different from either of said first or second sections, said third sealing member section having a substantial vertical dimension such that an upper portion is elevated above said second section and which extends to a plane in proximity to a lower edge of said second sealing member section, said third sealing member section also being offset from and connected to said second sealing member section on the opposite side thereto with respect to said first section.

14. The continuous sealing member of claim 13 further characterized in that said connecting strip is integrally connected to said first and second sections.

15. The continuous sealing member of claim 14 further characterized in that said third section is integral with said second section.

16. The continuous sealing member of claim 14 further characterized in that said third section has a width which is approximately the same as said second section and said first section.

17. The continuous sealing member of claim 16 further characterized in that said first section and said second section and said third section each have substantially the same thickness.

18. A sealed container construction comprised of:
(a) a first container shell with an outer container wall and having a first rim section thereon,
(b) a first outwardly projecting flange on said first rim section,
(c) a portion of said first rim section and said first outwardly projecting flange forming two surfaces of a sealing member enclosing space,
(d) a second container shell with an outer container wall and having a second rim section thereon,
(e) a second outwardly projecting flange on said second rim section and projecting toward the first rim section when the two container shells are connected to one another, the first flange on said first rim section projecting toward said second rim section when said container shells are connected together,
(f) a portion of said second rim section and said second outwardly projecting flange forming another two surfaces of a sealing member enclosing space, and
(g) a continuous sealing member disposed in the sealing member enclosing space formed by said flanges and rim sections and captured therein and which sealing member is not capable of being retentively held by either rim section alone, said sealing member being comprised of:
(1) a first sealing member section interposed between an edge of the first flange and a portion of the second rim section,
(2) a second sealing member section interposed between an edge of the second flange and a portion of the first rim section, and
(3) a third sealing member section extending between interior surfaces of the walls of said container shells.

19. The container construction of claim 18 further characterized in that the first section is offset from the second section and the second section is offset from the third section.

20. A continuous sealing member for use between a pair of container shells to provide a liquid tight seal between the container shells and which container shells each have opposed rims with a rim-forming surface on a first of the rims facing a projecting flange on a second of the rims and a projecting flange on the first rim adjacent said rim-forming surface on the first rim and facing a rim-forming surface on the second rim, said sealing member comprising:

(a) a first sealing member section which has a first cross sectional size and shape to engage the second rim-forming surface and an adjacent wall of the flange on the first rim and to also engage a portion of the flange on the second rim,
(b) a second sealing member section which has a second cross-sectional size and shape similar to that of said first sealing member section to engage a wall of the flange on the first rim and the rim-forming surface on the first rim and to also engage a portion of the flange on the second rim,
(c) a relatively thin strip connecting said second sealing member section to said first sealing member section in offset relationship therewith, and
(d) a third sealing member section which has a third cross-sectional size and shape substantially different from either of said first or second sealing member sections, said third sealing member section being offset from and connected to said second sealing member section to engage an interior surface of each of the container shells adjacent the respective first and second rims.

21. The continuous sealing member of claim 20 further characterized in that said connecting strip is integrally connected to said first and second sections and that said third section is integral with said second section.

22. The continuous sealing member of claim 20 further characterized in that said third section is offset from said second section on an opposite side thereto with respect to said first section and that said third section has portions which extend for a dimension greater than the connected first and second sections.

* * * * *